United States Patent
Mieldon et al.

(10) Patent No.: US 10,610,062 B2
(45) Date of Patent: Apr. 7, 2020

(54) WASHCLOTH IDENTIFICATION SYSTEM

(71) Applicants: Jeffery Alan Mieldon, Sun City Center, FL (US); Lela Banks Mieldon, Sun City Center, FL (US)

(72) Inventors: Jeffery Alan Mieldon, Sun City Center, FL (US); Lela Banks Mieldon, Sun City Center, FL (US)

( * ) Notice: Subject to any disclaimer, the term of this patent is extended or adjusted under 35 U.S.C. 154(b) by 0 days.

(21) Appl. No.: 16/433,436

(22) Filed: Jun. 6, 2019

(65) Prior Publication Data
US 2020/0069118 A1    Mar. 5, 2020

Related U.S. Application Data

(63) Continuation-in-part of application No. 29/661,931, filed on Aug. 31, 2018.

(51) Int. Cl.
| | |
|---|---|
| *A47K 10/12* | (2006.01) |
| *G09B 21/00* | (2006.01) |
| *G09F 23/00* | (2006.01) |
| *F16B 47/00* | (2006.01) |

(52) U.S. Cl.
CPC ............. *A47K 10/12* (2013.01); *F16B 47/00* (2013.01); *G09B 21/003* (2013.01); *G09F 23/00* (2013.01)

(58) Field of Classification Search
CPC ....... A47K 10/12; F16B 47/00; G09B 21/003; G09F 23/00
USPC .......................................... 248/205.5, 205.8
See application file for complete search history.

(56) References Cited

U.S. PATENT DOCUMENTS

| | | | | |
|---|---|---|---|---|
| 3,638,603 | A * | 2/1972 | Conover | A61J 7/04 116/308 |
| 4,699,279 | A * | 10/1987 | Spira | A47K 10/04 211/88.04 |
| 5,318,262 | A * | 6/1994 | Adams | F16B 47/00 248/205.8 |
| 6,308,923 | B1 | 10/2001 | Howard | |
| 6,401,943 | B1 * | 6/2002 | Root | A47K 1/09 206/362.1 |
| 6,402,104 | B1 | 6/2002 | Smith | |
| 6,405,973 | B1 * | 6/2002 | Hollinger | A47K 10/38 242/591 |
| 6,422,402 | B1 * | 7/2002 | Hollinger | A47G 21/16 211/13.1 |
| 6,550,735 | B1 * | 4/2003 | Zheng | F16B 47/00 248/205.5 |

(Continued)

*Primary Examiner* — Patrick D Hawn
(74) *Attorney, Agent, or Firm* — Boudwin Intellectual Property; Daniel Boudwin

(57) ABSTRACT

A washcloth identification system including a first holder and a second holder, each comprising a fastener on a rear side thereof. A washcloth support hook extends downwardly from each of the first holder and the second holder. A first set of numbered indicia is disposed on a front side of the first holder, and a second set of numbered indicia is disposed on a front side of the second holder. Each of the first hook and the second hook is configured to support a washcloth thereon. The fasteners are configured to secure the first and second holders to a wall of a shower, such that users can hang multiple washcloths. Tactile indicators having raised perimeter edges, such as raised Braille patterns, are overlaid on top of the numbered indicia. The holders can thus be identified by either sight or touch in order to identify which washcloth the user is retrieving.

18 Claims, 3 Drawing Sheets

(56) References Cited

U.S. PATENT DOCUMENTS

| | | | |
|---|---|---|---|
| 6,609,689 B1 * | 8/2003 | Knapp | A47K 5/04 248/205.5 |
| 6,896,228 B1 * | 5/2005 | Lu | A47K 3/003 211/105.1 |
| 6,932,306 B2 | 8/2005 | Zou et al. | |
| 7,607,622 B2 * | 10/2009 | Carnevali | F16B 47/00 248/205.5 |
| 7,635,111 B2 * | 12/2009 | Hara | F16B 47/00 248/205.5 |
| 7,648,109 B2 * | 1/2010 | Chen | F16B 47/00 248/205.5 |
| 7,658,354 B2 * | 2/2010 | Wang | F16B 47/00 248/205.5 |
| 7,975,972 B1 * | 7/2011 | Hajianpour | F16B 47/006 206/829 |
| 8,087,190 B1 * | 1/2012 | Rivera-Andrianakos | G09F 3/00 211/189 |
| 8,128,042 B1 * | 3/2012 | Chen | F16B 47/006 211/106 |
| 8,292,253 B2 | 10/2012 | Zhadanov | |
| 8,480,045 B2 * | 7/2013 | Adams, IV | F16B 47/00 248/205.5 |
| D698,581 S * | 2/2014 | Arboleda | D6/534 |
| 8,640,890 B2 * | 2/2014 | Schiller | B65B 67/1227 211/12 |
| 9,091,294 B2 * | 7/2015 | Zhang | F16B 47/00 |
| 9,345,347 B2 * | 5/2016 | Lan | A47G 1/17 |
| 9,624,963 B2 * | 4/2017 | Shi | A47K 10/14 |
| 9,664,227 B2 * | 5/2017 | Huang | F16B 47/006 |
| 9,695,974 B2 * | 7/2017 | Gordon | F16M 13/022 |
| 9,746,022 B2 * | 8/2017 | Shi | F16B 47/00 |
| 10,208,786 B2 * | 2/2019 | Tooley | A47K 10/10 |
| 2004/0079848 A1 * | 4/2004 | Wu | F16B 45/00 248/205.5 |
| 2008/0277544 A1 * | 11/2008 | Chen | F16B 47/00 248/205.9 |
| 2014/0360954 A1 * | 12/2014 | Andrews | A61J 1/03 211/71.01 |
| 2016/0215813 A1 * | 7/2016 | Huang | F16B 47/006 |
| 2017/0023051 A1 | 1/2017 | Kobayashi | |

* cited by examiner

WASHCLOTH IDENTIFICATION SYSTEM

CROSS REFERENCE TO RELATED APPLICATIONS

This application claims the benefit of U.S. Design patent application Ser. No. 29/661,931 filed on Aug. 31, 2018. The above identified patent application is herein incorporated by reference in its entirety to provide continuity of disclosure.

BACKGROUND OF THE INVENTION

The present invention relates to hangers for washcloths. More specifically, the present invention provides a washcloth identification system that includes multiple washcloth holders with tactile indicators so that a user may identify by touch which washcloth they are currently using.

Many individuals utilize washcloths to clean themselves with soap and water while bathing. Washcloths provide a more effective means for self-cleaning than merely using the hands alone, as the fabric material of the washcloth helps to build up lather with the soap that is used. Further, the exterior surface of the fabric material provides a scrubbing surface that is more effective for cleaning than skin-to-skin contact. One drawback to washcloths is that they tend to retain built up soap and any dirt or other grime that has been cleaned with the washcloth. It can very time consuming to thoroughly rinse and clean a washcloth to remove all of the retained soap and grime.

One common solution is to utilize multiple washcloths at different stages of cleaning. For example, one washcloth may be designated to apply soap and scrub the user, while another washcloth may be designated to help rinse the user, such that only the first washcloth is dirtied. Other users may designate particular washcloths for cleaning particular body parts, such that no cross-contamination occurs. While this method is easier than repeatedly recleaning a single washcloth, it can be difficult for individuals to identify which washcloth is which. While in the shower, individuals often have their eyes closed due to the running water, so it can be difficult to see when retrieving a particular washcloth. Further, individuals with limited or zero vision capabilities may have a difficult time discerning which washcloth is which by simply touching each washcloth. In order to address these concerns, the present invention proceeds a washcloth identification system that allows users to hang multiple washcloths for easy access in a shower, while also providing a combination of visual and tactile indicators that can be observed or touched to determine the identity of a particular washcloth amongst multiple washcloths.

Devices have been disclosed in the known art that relate to washcloth holders. These include devices that have been patented and devices that have been disclosed in published patent applications. However, these devices have several drawbacks. For example, some devices in the known art include hooks that are meant to secure within a shower to hold one or more washcloths. However, these devices are limited to holding the washcloth and lack mechanisms for identifying particular washcloths. Particularly, the devices in the known art fail to provide washcloth holding systems that include the combination of visual and tactile indicators for determining by sight or touch which washcloth is which.

In light of the devices disclosed in the known art, it is submitted that the present invention substantially diverges in design elements from the known art and consequently it is clear that there is a need in the art for an improvement to existing washcloth hanger devices. In this regard the present invention substantially fulfills these needs.

SUMMARY OF THE INVENTION

In view of the foregoing disadvantages inherent in the known types of washcloth holders now present in the prior art, the present invention provides a washcloth identification system wherein the same can be utilized for providing convenience for the user when hanging a pair of washcloths in the shower and using both visual and tactile indicators to identify each washcloth. The present system comprises a first holder and a second holder, each comprising a fastener on a rear side thereof. A first hook extends downwardly from the first holder, and a second hook extends downwardly from the second holder. A first set of indicia is disposed on a front side of the first holder, and a second set of indicia is disposed on a front side of the second holder. A tactile indicator, such as a raised Braille pattern, is overlaid on top of each set of numbered indicia. Each of the first hook and the second hook is configured to support a washcloth thereon, such that either the tactile indicators or the numbered indicia can be utilized to determine which washcloth an individual is retrieving from the hooks.

An object of the present invention is to provide a washcloth identification system including all of the advantages of washcloth holding and identifying systems in the known art with none of the disadvantages.

A further object of the present invention is to provide a washcloth identification system that includes raised Braille patterns overlaid on top of printed number indicia to allow individuals to identify a particular washcloth holder by either sight or touch.

Another object of the present invention is to provide a washcloth identification system that includes holders having suction cups for easy removable securement to a shower wall.

Yet another object of the present invention is to provide a washcloth identification system that includes at least two holders having two separate and distinct colors, so that the holders can be identified by color.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
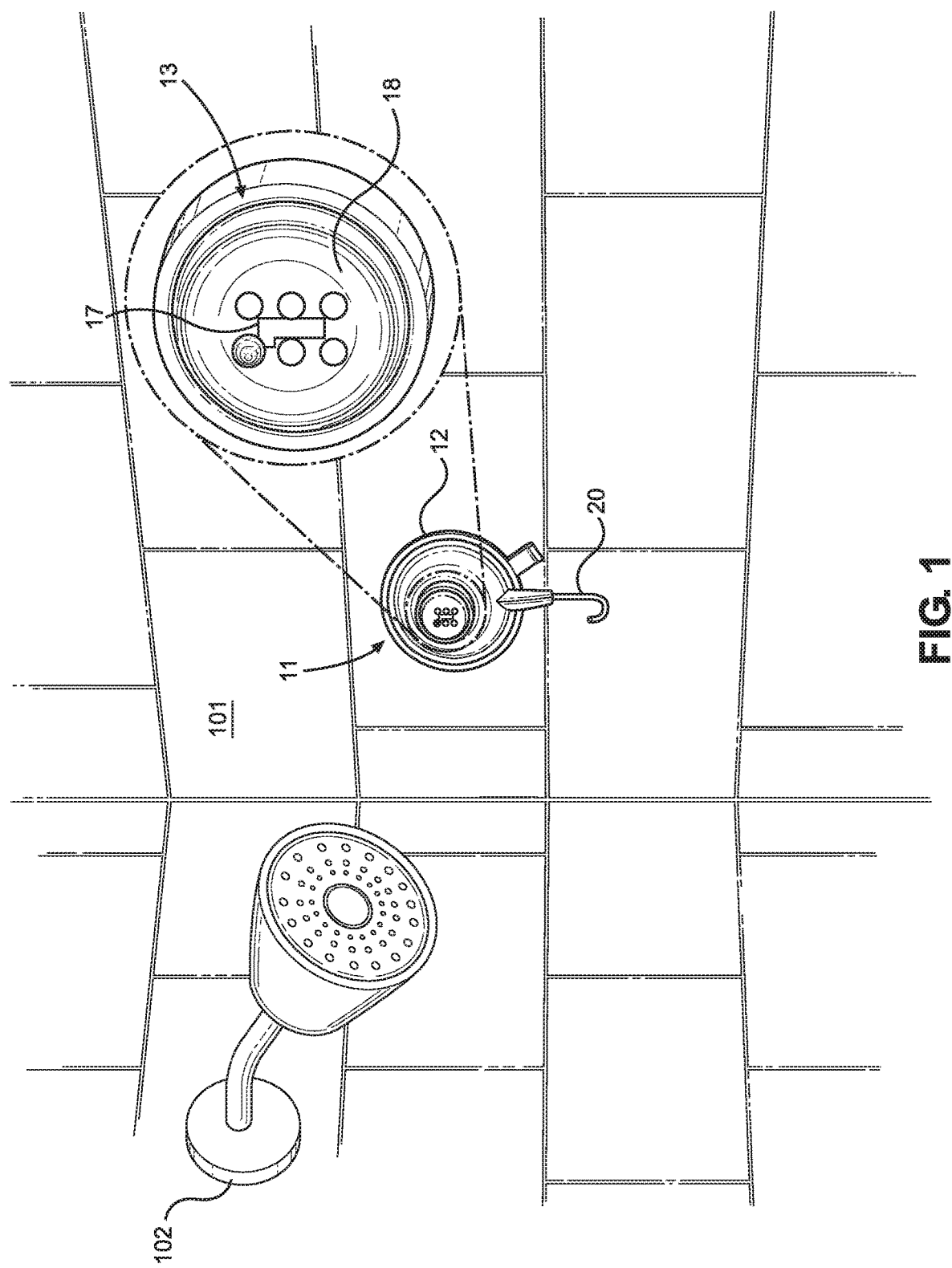
FIG. 1 shows a perspective view of a first holder of the washcloth identification system, with a callout view of the tactile indicator portion.

Reference is made herein to the attached drawings. Like reference numerals are used throughout the drawings to depict like or similar elements of the washcloth identification system. For the purposes of presenting a brief and clear description of the present invention, the preferred embodiment will be discussed as used for holding washcloths within a shower with multiple tactile indicators for identifying by touch which washcloth is currently being used. The figures are intended for representative purposes only and should not be considered to be limiting in any respect.

Referring now to FIG. 1, there is shown a perspective view of a first holder of the washcloth identification system, with a callout view of the tactile indicator portion. The washcloth identification system is intended to be used within a shower stall, such that a first holder 11 and a second holder (shown in FIGS. 2 and 3) can be removably secured to a wall 101 of the shower stall, preferably in close proximity to the shower head 102. The first holder 11 includes a fastener 12 configured to removably secure the holder 11 to the shower wall 101 and a hook 20 extending downwardly from a lower end of the holder 11. The hook is adapted to support a washcloth thereon in a hanging configuration.

The first holder 11 further includes a first indicator section 13 that can be utilized to identify a particular washcloth stored on the hook 20. The indicator section 13 itself is raised and offset from the surrounding surface of the first holder 11, such that the user will tend make contact with the indicator section 13 when reaching for the first holder 11. The indicator section 13 includes printed number indicia 17 and a tactile indicator 18 comprising a raised Braille pattern, such that the pattern includes raised perimeter edges for greater tactile response. In the illustrated embodiment, the raised Braille pattern 18 overlays the number indicia 17. The tactile indicator can be touched by the user to provide a tactile response to the user, such that the user can identify which washcloth holder they are touching without looking at it. Alternatively, the user can read the numbered indicia situated behind or beneath the raised Braille pattern in order to visually identify the washcloths. In the shown embodiment, the number indicia 17 includes the numeral "1", and the Braille pattern 18 is the pattern for the number "1". However, alternate numbers or symbols may be utilized if desired.

Figure 2:
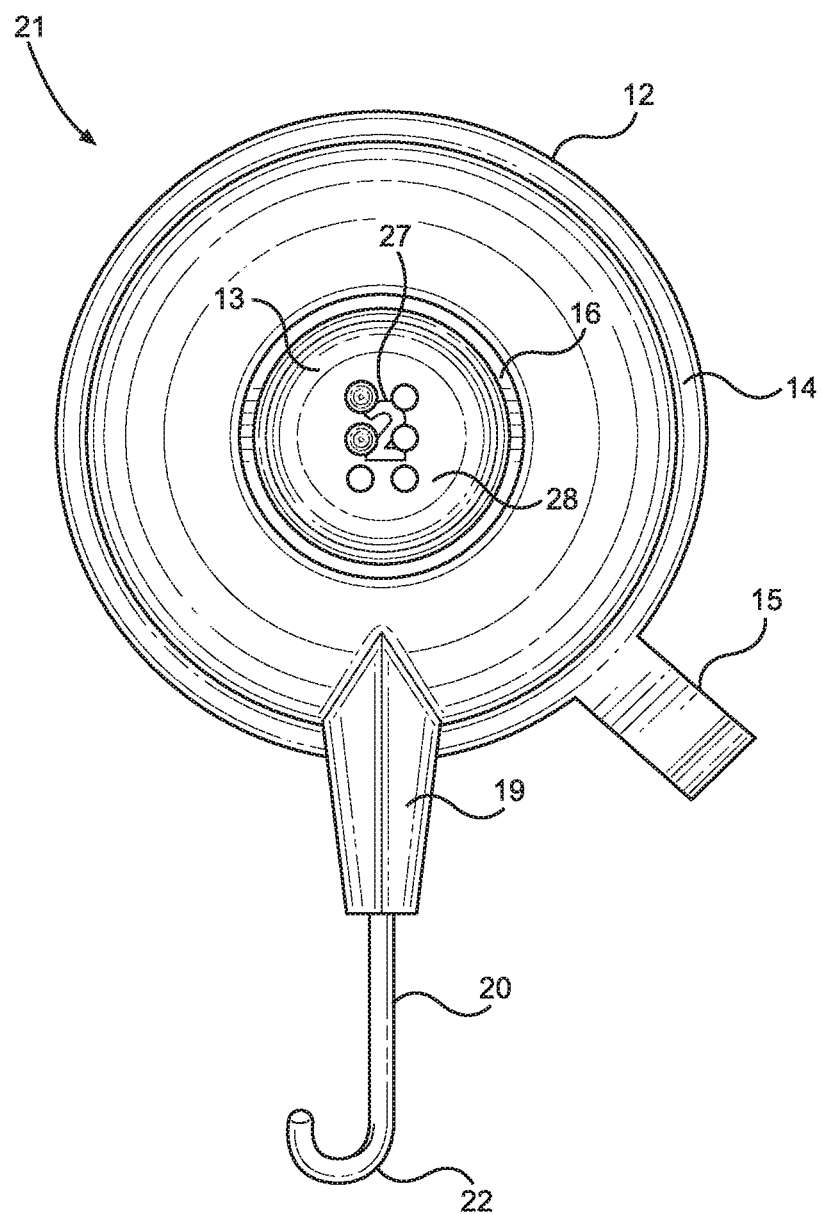
FIG. 2 shows a perspective view of a second holder of the washcloth identification system.

Referring now to FIG. 2, there is shown a perspective view of a second holder of the washcloth identification system. The system includes multiple washcloth holders that each include distinct indicators, for both the numbered indicia and raised Braille patterns that overlay the numbered indicia. In the shown embodiment, the system includes a first holder and a second holder 21. However, in other embodiments, an unlimited number of holders may be utilized, so long as each holder includes a distinct numbered indicia and a distinct raised Braille pattern.

In the shown embodiment, the second holder 21 includes an indicator section 13 having a second numbered indicia 27 and a second raised Braille pattern 28 to allow users to distinguish the second holder 21 from the first holder by touch. In some embodiments, the indicator section 13 is removable from the main body of the holder 21. The indicator section 13 can be secured to the holder 21 via a friction fit or via any other suitable connection mechanism. This allows users to swap different indicator sections 13 in and out if they wish to use different indicators for identification purposes. The raised perimeter edges of the Braille patterns 28 allow users to easily feel and determine which holder they are accessing, while the numbered indicia allows users to identify the holder by sight.

In the shown embodiment, the fastener 12 comprises a suction cup fastener 13 that allows the holder 21 to be easily secured to and subsequently removed from a shower wall. In the shown embodiment, the holder 21 further comprises a pull tab 15 configured to release the suction fastener 14 when pulled outwardly from a perimeter of the holder 21. The pull tab 15 allows users to easily break suction when they desire to remove or reposition the holder 21.

Each holder 21 includes a hook 20 that is configured to hold a washcloth thereon. In the shown embodiment, the hook 20 connects to an extension member 19 that extends outwardly and downwardly from the holder 21. The extension member 19 includes a width at an upper end thereof that is greater than a width of a lower end thereof, such that the extension member 19 tapers inwardly toward the hook 20. This provides a more stable connection between the hook 20 and the holder 21. Further, the hook includes a vertical portion 20 terminating in an upwardly curved lower end 22, such that a washcloth can conform to the distal end of the curved hook 20 and be effectively supported thereon.

Figure 3:
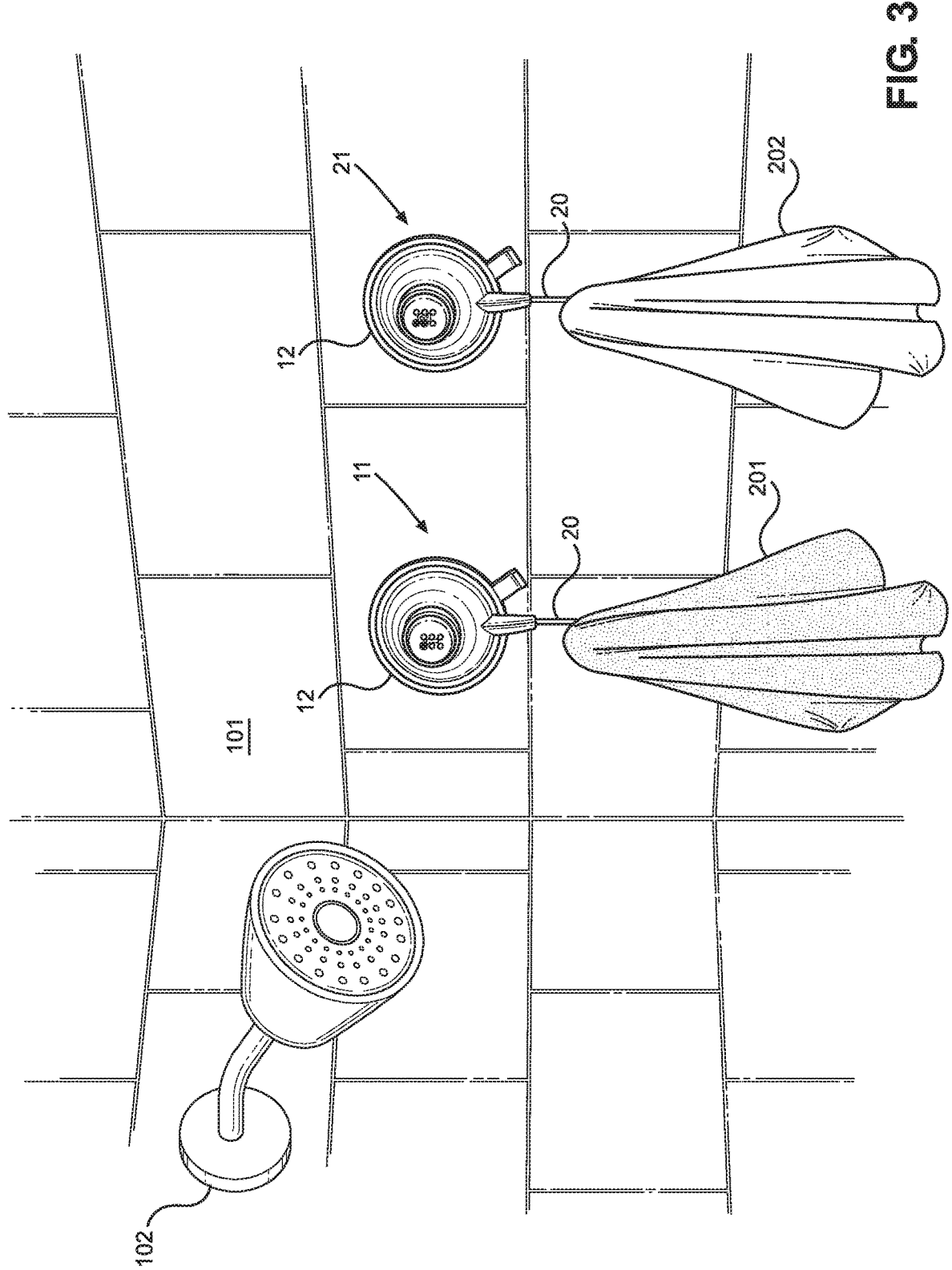
FIG. 3 shows a perspective view of the first and second holders of the washcloth identification system in use within a shower.

Referring now to FIG. 3, there is shown a perspective view of the first and second holders of the washcloth identification system in use within a shower. In use, the first holder 11 and the second holder 21 are secured adjacent one another to a shower wall 101 via fasteners 12, preferably near the shower head 102. The first holder 11 supports a first washcloth 201 thereon, and the second holder 21 supports a second washcloth 202 thereon. The user can have their own preferences for which washcloth is used for a particular task, and the distinct numbered indicia and raised Braille patterns on each holder 12, 21 allows users to distinguish between two or more washcloths 201, 202. In this way, additional holders may be utilized to support and identify additional washcloths as needed.

In some embodiments, the first holder 11 includes a first distinct color, and the second holder 21 includes a second distinct color. This allows users to visually identify each washcloth when they are able to do so, providing for an added visual identification mechanism in addition to the numbered indicia. This can be potentially useful for individuals who are unable to read numbers, since it provides them with an alternative mechanism for identifying the washcloth holder. The first and second holders can include, for example, one lighter color such as white, and one darker color such as a dark green, in order for individuals with some form of colorblindness to still distinguish between the differently colored holders. Using white as a color for one of the holders would reduce manufacturing costs due to the lack of a need for pigment to be applied to the construction materials. Further, in the shown embodiments, the first holder and the second holder have circular perimeter edges. In other embodiments, the perimeter edges can have other shapes, such as rectangular, for example.

Overall, the present invention provides a washcloth identification system that can be utilized to identify a particular washcloth by touch while bathing. The user can utilize the combination of the color of the holder, the printed numbered indicia, and the raised Braille patterns to identify a particular holder or washcloth the user is accessing. In this way, the user is able to identify which washcloth they wish to use regardless of the user's visual capabilities.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A washcloth identification system, comprising:
   a first holder and a second holder, each comprising a fastener on a rear side thereof;
   a first hook extending downwardly from the first holder;
   a second hook extending downwardly from the second holder;
   a first numbered indicia disposed on a front side of the first holder;
   a second numbered indicia disposed on a front side of the second holder;
   wherein, the first numbered indicia and the second numbered indicia identifies the first holder as different from the second holder;
   a first tactile indicator overlaying the first numbered indicia;
   a second tactile indicator overlaying the second numbered indicia;
   wherein each of the first hook and the second hook is configured to support a washcloth thereon.

2. The washcloth identification system of claim 1, wherein the first numbered indicia comprises a first number, wherein the second indicia comprises a second number, wherein the first tactile indicator comprises a first Braille pattern having a raised perimeter edge, and wherein the second tactile indicator includes a second Braille pattern having a raised perimeter edge.

3. The washcloth identification system of claim 1, wherein the first holder comprises a first color, and wherein the second holder comprises a second distinct color.

4. The washcloth identification system of claim 1, wherein each of the first hook and the second hook comprises an upper vertical portion that terminates in an upwardly curving lower portion.

5. The washcloth identification system of claim 1, wherein each of the first hook and the second hook is connected to an extension member that extends outwardly and downwardly from a main body of the first holder and a main body of the second holder, respectively.

6. The washcloth identification system of claim 1, wherein each of the first holder and the second holder comprises an indicator section that is raised and offset from a surrounding surface.

7. The washcloth identification system of claim 6, wherein each indicator section of each of the first holder and the second holder is removably securable to the surrounding surfaces of the first holder and the second holder.

8. The washcloth identification of claim 1, wherein the first holder and the second holder include circular perimeter edges.

9. A washcloth identification system, comprising:
   a first holder and a second holder, each comprising a suction cup disposed on a rear side thereof;
   a first hook extending downwardly from the first holder;
   a second hook extending downwardly from the second holder;
   a first numbered indicia disposed on a front side of the first holder;
   a second numbered indicia disposed on a front side of the second holder;
   wherein, the first numbered indicia and the second numbered indicia identifies the first holder as different from the second holder;
   a first tactile indicator overlaying the first numbered indicia;
   a second tactile indicator overlaying the second numbered indicia;
   wherein each suction cup is configured to secure the first holder and the second holder to a wall of a shower;
   wherein each of the first hook and the second hook is configured to support a washcloth thereon.

10. The washcloth identification system of claim 9, wherein the first numbered indicia comprises a first number, wherein the second indicia comprises a second number, wherein the first tactile indicator comprises a first Braille pattern having a raised perimeter edge, and wherein the second tactile indicator includes a second Braille pattern having a raised perimeter edge.

11. The washcloth identification system of claim 9, wherein the first holder comprises a first color, and wherein the second holder comprises a second distinct color.

12. The washcloth identification system of claim 9, wherein each of the first hook and the second hook comprises an upper vertical portion that terminates in an upwardly curving lower portion.

13. The washcloth identification system of claim 9, wherein each of the first hook and the second hook is connected to an extension member that extends outwardly and downwardly from a main body of the first holder and a main body of the second holder, respectively.

14. The washcloth identification system of claim 13, wherein each extension member includes an upper portion having a first width that is less than a second width of a lower portion.

15. The washcloth identification system of claim 9, wherein each of the first holder and the second holder comprises an indicator section that is raised and offset from a surrounding surface.

16. The washcloth identification system of claim 15, wherein each indicator section of each of the first holder and the second holder is removably securable to the surrounding surfaces of the first holder and the second holder.

17. The washcloth identification of claim 9, wherein the first holder and the second holder include circular perimeter edges.

18. The washcloth identification system of claim 9, wherein each of the first holder and the second holder comprises a pull tab configured to release the suction fastener when pulled outwardly from a perimeter of the first holder and the second holder.

* * * * *